(12) United States Patent
Morita et al.

(10) Patent No.: US 6,703,554 B2
(45) Date of Patent: Mar. 9, 2004

(54) INFRARED DETECTING DEVICE

(75) Inventors: Shinichi Morita, Kanagawa (JP); Nami Shibata, Saitama (JP)

(73) Assignee: IHI Aerospace Co., Ltd., Tokyo (JP)

( * ) Notice: Subject to any disclaimer, the term of this patent is extended or adjusted under 35 U.S.C. 154(b) by 113 days.

(21) Appl. No.: 10/004,824

(22) Filed: Dec. 7, 2001

(65) Prior Publication Data

US 2002/0069910 A1 Jun. 13, 2002

(30) Foreign Application Priority Data

Dec. 7, 2000 (JP) .......................... 2000-372773

(51) Int. Cl.[7] .................. H01L 35/28; H01L 31/058
(52) U.S. Cl. ...................... 136/225; 257/467
(58) Field of Search ................ 136/213, 224, 136/225; 257/431, 461, 465, 467, 930

(56) References Cited

U.S. PATENT DOCUMENTS

| 4,032,363 A | 6/1977 | Raag | 136/211 |
| 5,100,479 A | 3/1992 | Wise et al. | 136/225 |
| 6,163,061 A | 12/2000 | Iida | 257/467 |

FOREIGN PATENT DOCUMENTS

| JP | 11051762 | 2/1999 |

OTHER PUBLICATIONS

"Infrared thermopile sensors with high sensitivity and very low temperature coefficient", J. Schieferdecker, R. Quad, E. Holzenkämpfer, M. Schulze, Sensors and Actuators A, Elsevier Sequoia S.A., Lausanne, CH, 1995, pp. 422–427.

*Primary Examiner*—Stephen Kalafut
*Assistant Examiner*—Thomas H. Parsons
(74) *Attorney, Agent, or Firm*—Sughrue Mion, PLLC

(57) ABSTRACT

An infrared detecting device possible to improve SN ratio, which is provided with a semiconductor substrate, a diaphragm set on the semiconductor substrate, a thermopile formed on the diaphragm by arranging a plurality of thermocouples composed of p-type polysilicon and n-type polysilicon in a row and electrically connecting them each other in series, and a heat absorption film formed on the central portion through an insulation layer, and sectional areas of the p-type and n-type polysilicons between hot and cold junctions of each of the thermocouples are made different from each other.

16 Claims, 4 Drawing Sheets

INFRARED DETECTING DEVICE

BACKGROUND OF THE INVENTION

1. Field of the Invention

The present invention relates to an infrared detecting device.

2. Description of the Prior Art

In general, an infrared detecting device includes the thermopile type, pyroelectric type, and bolometer type. The thermopile infrared detecting device includes the types shown in FIGS. 5 and 6, for example.

The difference between the thermopile infrared detecting devices shown in FIGS. 5 and 6 depends on the anisotropic etching method of the micromachining technique.

In the case of the infrared detecting device in FIG. 5, etching is started from the surface of a semiconductor substrate to form a diaphragm having a low thermal conductivity on the surface side and form a thermopile on the diaphragm.

In the case of the infrared detecting device in FIG. 6, the thermopile is formed on the surface of a semiconductor substrate, however etching is started from the back side of the semiconductor substrate.

The infrared detecting device in FIG. 5 is described below. As shown in FIG. 5, the thermopile infrared detecting device S1 is provided with a semiconductor substrate 101, a diaphragm 102 set on the semiconductor substrate 101 and having a low thermal conductivity, a thermopile 104 formed on the diaphragm 102, and a heat absorption film 105 formed through an insulation layer 103 located at the central portion. Thermopile 104 is formed by arranging a plurality of thermocouples 113 constituted by arranging p-type polysilicon 110 and n-type polysilicon 111, having the same width and thickness relative to each other, in parallel and electrically connecting them in series via aluminum wiring 112.

In order to improve the performance of the above infrared detecting device, it is required to increase the ratio of an output signal to a noise, that is, so-called SN ratio (Signal to Noise ratio). However, in the case of the above conventional infrared detecting device S1, the difference between electrical resistivities of the p-type polysilicon 110 and n-type polysilicon 111 of the thermocouple 113 and the difference between thermal conductivities of them are not considered at the time of designing the thermopile 104 and the width and thickness of each polysilicon are the same. Therefore, there is a problem in that it is difficult to obtain the device with high SN ratio and it is the subject to solve the above-mentioned problem.

SUMMARY OF THE INVENTION

The present invention is made in view of the aforementioned subject and it is an object to provide an infrared detecting device capable of setting sectional areas of p-type polysilicon and n-type polysilicon of a thermocouple to values suitable for improving the SN ratio.

The infrared detecting device according to the present invention is characterized by comprising a semiconductor substrate, a diaphragm set on the semiconductor substrate and having low thermal conductivity, a thermopile formed on the diaphragm by arranging a plurality of thermocouples composed of p-type polysilicon and n-type polysilicon in a row and electrically connecting the thermocouples with each other in series, and a heat absorption film formed on a detecting section of the thermopile through an insulation layer, wherein the p-type and n-type polysilicons are different in their sectional areas from each other at a position between a hot junction and a cold junction of each of the thermocouples forming the thermopile, in order to achieve the above subject on the prior art.

The infrared detecting device according to the first preferred embodiment of the present invention is constituted so that the p-type and n-type polysilicons are different in their average sectional areas from each other at the position between the hot and cold junctions of each of the thermocouples, and the infrared detecting device according to the second preferred embodiment of the present invention is characterized in that Ap/An ratio of the sectional area of the p-type polysilicon to that of the n-type polysilicon is in a range of $\sqrt{(m)}$ to $\sqrt{(m)/n}$ when a gap between the p-type and n-type polysilicons is constant and ρp/ρn ratio of electric resistivity of the polysilicons is defined as "m" and kp/kn ratio of thermal conductivity of the polysilicons is defined as "n".

The infrared detecting device according to the third preferred embodiment of the present invention is characterized in that the p-type and n-type polysilicons are equivalent in their thickness, and different in their width from each other at the position between the hot and cold junctions of each of the thermocouples, the infrared detecting device according to the fourth preferred embodiment of the present invention is constituted so that the p-type and n-type polysilicons are equivalent in their width, and different in their thickness from each other at the position between the hot and cold junctions of each of the thermocouples, the infrared detecting device according to the fifth preferred embodiment of the present invention is constituted so that Wp/Wn ratio of the width of the p-type polysilicon to that of the n-type polysilicon is in a range of $\sqrt{(m)}$ to $\sqrt{(m)/n}$ when a gap between the p-type and n-type polysilicons is constant, the p-type and n-type polysilicons are equivalent in their thickness, ρp/ρn ratio of electric resistivity of the polysilicons is defined as "m" and kp/kn ratio of thermal conductivity of the polysilicons is defined as "n", and the infrared detecting device according to the sixth preferred embodiment of the present invention is characterized in that tp/tn ratio of the thickness of the p-type polysilicon to that of the n-type polysilicon is in a range of $\sqrt{(in)}$ to $\sqrt{(m)In}$ when a gap between the p-type and n-type polysilicons is constant, the p-type and n-type polysilicons are equivalent in their width, ρp/ρn ratio of electric resistivity of the polysilicons is defined as "m" and kp/kn ratio of thermal conductivity of the polysilicons is defined as "n".

The infrared detecting device according to the seventh preferred embodiment of the present invention is characterized in that ratio of width of polysilicon with high thermal conductivity to that of polysilicon with low thermal conductivity is maximized when the number of the thermocouples and a gap between the p-type and n-type polysilicons are constant, and the polysilicons are equivalent in their thickness.

DETAILED DESCRIPTION OF THE INVENTION

Figure 1A:
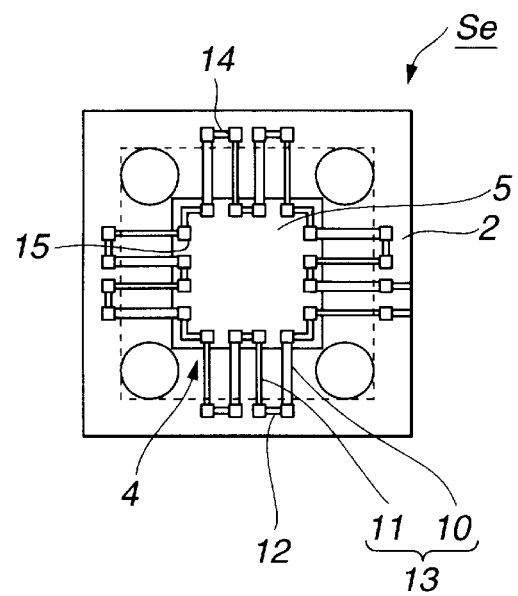
FIG. 1A is a top view showing an infrared detecting device according to an embodiment of of this invention.

In the above-described infrared detecting devices, the phenomenon (Seebeck effect) is applied that electromotive force is generated according to a temperature difference between semiconductor substrate and heat absorption area, that is the temperature difference between cold junction and hot junction, and the electromotive force (output signal S) can be expressed by the number n of a thermocouple, Seebeck coefficient $\alpha$, heat resistance Rth, and energy P obtained when incident infrared energy is absorbed with a heat absorption film and converted into heat, as shown in numerical formula (1). That is, the output signal S is proportional to the magnitude of the heat resistance of the device.

$$S = P \cdot R = n \cdot \alpha \cdot \Delta T = n \cdot \alpha \cdot Rth \cdot P \quad (1)$$

In the above expression, R denotes sensitivity and $\Delta T$ denotes the temperature difference between the cold junction and the hot junction. The heat resistance of the thermocouple is proportional to length of the thermocouple and inversely proportional to a sectional area of polysilicon as shown in numerical formula (2). From numerical formulas 1 and 2, it is found that high-output signal S can be obtained by increasing the length and the number of thermocouples or decreasing width and thickness of the polysilicon.

$$Rth = L/(kp \cdot Ap + kn \cdot An) = L/(kp \cdot Wp \cdot tp + kn \cdot Wn \cdot tn) \quad (2)$$

In the above expression, L denotes the length between hot junction and cold junction, kp, Ap, Wp, and tp denote thermal conductivity, sectional area, width, and thickness of p-type polysilicon, and kn, An, Wn, and tn denote thermal conductivity, sectional area, width, and thickness of n-type polysilicon, respectively.

However, when simply increasing the length and the number of thermocouples or decreasing the width or the thickness of the polysilicons, noise voltage N rises as electrical resistance Re increases as shown in numerical formulas 3 and 4.

$$N = (4 \cdot k \cdot T \cdot \Delta f \cdot Re)^{1/2} \quad (3)$$

In the above expression, k denotes Boltzmann constant, T denotes absolute temperature, and $\Delta f$ denotes frequency band width.

$$Re = n \cdot (Rep + Ren) = n \cdot L(\rho p / Wp \cdot tp + \rho n / Wn \cdot tn) \quad (4)$$

In the above expression, Rep and $\rho p$ denote electrical resistance and electric resistivity of the p-type polysilicon, and Ren and $\rho n$ denote electrical resistance and electric resistivity of the n-type polysilicon.

When assuming the structure of a diaphragm to be constant and a plurality of thermocouples are formed on the diaphragm, influence of SN ratio caused by the thermocouples are considered. It is necessary to set the sectional area of the polysilicon to the optimum value at the time of designing a thermopile in order to improve SN ratio on the whole, therefore Ap/An ratio of the sectional areas, Wp/Wn ratio of the width and tp/tn ratio of the thickness of the p-type and n-type polysilicons are set respectively in the range of $\sqrt{(m)}$ to $\sqrt{(m)}/n$ as described above in the infrared detecting devices according to the preferred embodiments of this invention.

Thermal time constant $\tau$ can be expressed by using heat capacity C and the heat resistance Rth of the device as shown in numerical formula (5). Therefore, when the diaphragm of the device is constant (heat capacity C is constant), the thermal time constant $\tau$ increases as the heat resistance Rth increases. Accordingly, in the infrared detecting devices according to the other preferred embodiment of this invention, it is preferable to increase the sectional area of the polysilicon higher in the heat conductivity. In general, the heat conductivity of the n-type polysilicon is larger than that of the p-type polysilicon when impurities in the same quantities are doped in the p-type and n-type polysilicons Therefore, the Ap/An ratio of the sectional areas, Wp/Wn ratio of width and tp/tn ratio of thickness of the p-type and n-type polysilicons are set so to be minimized (so that the width of the n-type polysilicon may be maximized as compared with that of the p-type polysilicon).

$$\tau = C \cdot Rth \quad (5)$$

In the infrared detecting according to the present invention having the above-mentioned configuration, it is possible to individually decide sectional areas between cold and hot junctions of the p-type and n-type polysilicons of the thermocouple in consideration of the differences of the electrical resistivities and heat conductivities between the p-type polysilicon and the n-type polysilicon. As a result, performance of the both polysilicons is completely derived and SN ratio is improved.

Because the infrared detecting device according to the second preferable embodiment of the present invention has the above-mentioned configuration, sectional areas of the p-type polysilicon and the n-type polysilicon of the thermocouple are respectively set to the optimum value, so that the highest SN ratio is obtained.

Because the infrared detecting device according to the fifth or the sixth embodiment of the present invention has the above-mentioned configuration, width of the p-type polysilicon and the n-type polysilicon of the thermocouple (thickness of them in the case of the infrared detecting device according to the sixth embodiment) are set into the optimum value and the highest SN ratio is obtained.

Because the infrared detecting device according to the seventh embodiment of the present invention has the above-mentioned configuration, the response speed remarkably rises according as the sectional-area ratio, the width ratio, or the thickness ratio decreases (according as the polysilicon having the higher heat conductivity becomes larger).

DESCRIPTION OF THE PREFERRED EMBODIMENTS

The present invention is described below on basis of the accompanying drawings.

Figure 1B:
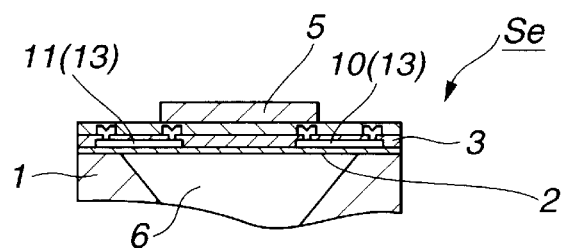
FIG. 1B is a sectional view of the infrared detecting device shown in FIG. 1A.
Figure 1C:
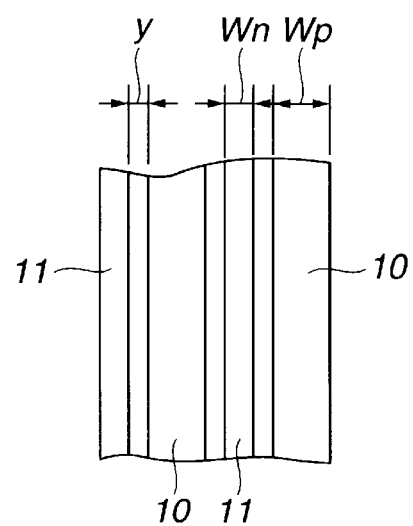
FIG. 1C is a partially enlarged view of the infrared detecting device shown in FIG. 1A.
Figure 2:
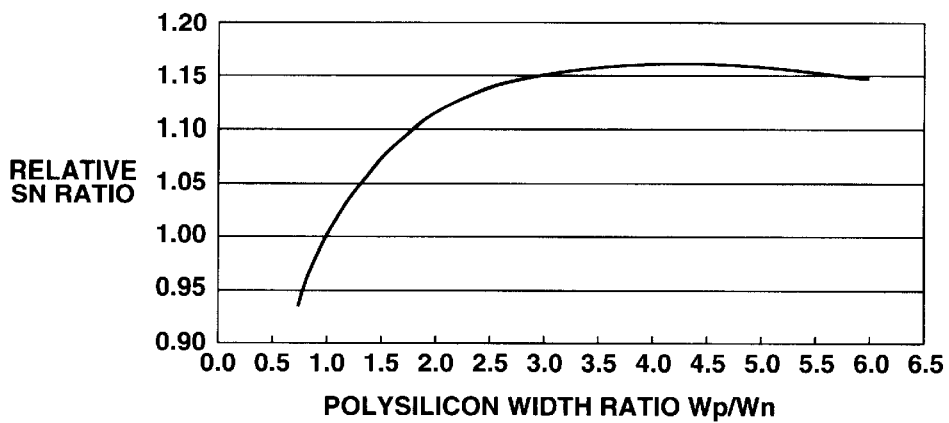
FIG. 2 is a graph showing the relation between relative SN ratio and polysilicon width ratio Wp/Wn.

FIGS. 1 and 2 show an embodiment of the infrared detecting device according to the present invention. As shown by the top view in FIG. 1A and the sectional view in FIG. 1B, a thermopile-type infrared detecting device Se is provided with a semiconductor substrate 1, a diaphragm 2 set on the semiconductor substrate 1 through a cavity 6 and having low heat conductivity, and a thermopile 4 formed on the diaphragm 2 by arranging a plurality of thermocouples 13 constituted by connecting p-type polysilicons 10 and n-type polysilicons 11 having the same thickness but having width different from each other by distributing aluminum wires 12 in a row and electrically connecting them each other in series, and a heat absorption film 5 is formed at the central portion through an insulation layer 3. The electromotive force in the thermopile infrared detecting device Se depends on the temperature difference between a hot junction 15 and a cold junction 14.

In this case, a gap "y" between the p-type polysilicon 10 and the n-type polysilicon 11 adjacent to each other and the thickness of these polysilicons 10 and 11 are constant as shown also in FIG. 1C. Wp/Wn ratio of the width Wp of the p-type polysilicon 10 to the width Wn of the n-type polysilicon 11 is set so as to be in a range of $\sqrt{(m)}$ to $\sqrt{(m)}/n$ when $\rho p/\rho n$ ratio of the electric resistivity of the p-type polysilicon 10 to that of the n-type polysilicon 11 is defined as "m" and kp/kn ratio of the heat conductivity of the p-type polysilicon 10 to that of the n-type polysilicon is defined as "n".

For example, the following calculation results are obtained in a case where the electric resistivity $\rho p$ of the p-type polysilicon 10 is 0.006075 $\Omega$cm, the heat conductivity kp of the polysilicon 10 is 0.18 W/cm/K, and the electric resistivity $\rho n$ of the n-type polysilicon 11 is 0.00085 $\Omega$cm and the heat conductivity kn of the polysilicon 11 is 0.30 W/cm/K on referring to Sensor and Actuators A, 41–42, pp. 161–164 (1994).

$\sqrt{(m)}$=2.67

$\sqrt{(m)}/n$=4.46

Therefore, it is possible to improve the SN ratio by setting the Wp/Wn ratio of the width of the p-type polysilicon 10 to that of the n-type polysilicon 11 in a range of 2.67 to 4.46 in this embodiment. The relationship between the relative SN ratio and the polysilicon width ratio Wp/Wn is shown in the graph of FIG. 2 in a case where the diaphragm 2 has 160 $\mu$m in size, the heat absorption film 5 has 116 $\mu$m in size, the heat conductivity of the diaphragm 2 made of SiN is 0.026 W/cm/K and the thickness of the diaphragm 2 is approx. 0.4 $\mu$m in total, the heat conductivity of a silicon oxide film is 0.014 W/cm/K and the thickness of the silicon oxide film is approx. 0.8 $\mu$m in total, the length L of the thermopile 4 is approx. 22 $\mu$m, the gap "y" between the respective polysilicons 10 and 11 is constant of approx. 0.8 $\mu$m and the thickness of the polysilicons 10 and 11 is approx. 0.4 $\mu$m.

It is apparent from FIG. 2 that the SN ratio is improved by 15% or more by setting the width Wp of the p-type polysilicon 10 into 4.4 $\mu$m and setting the width Wn of the n-type polysilicon 11 into 1.2 $\mu$m, that is, the width ratio Wp/Wn is 3.67 rather than setting the width Wp of the p-type polysilicon 10 and the width Wn of the n-type polysilicon 11 equally into 2.8 $\mu$m.

Figure 3:
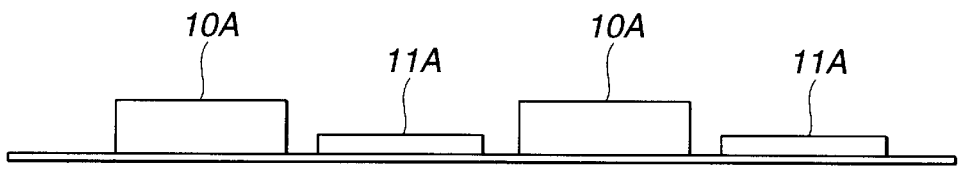
FIG. 3 is a partially sectional view showing an infrared detecting device according to another embodiment of the present invention.

Because actual length of the both polysilicons 10 and 11 (actual longitudinal and crosswise lengths of the infrared detecting device Se) are exceptionally larger than the gap "y", the length of the polysilicons 10 and 11 and the gap "y" are shown in FIG. 1A by making scales of them different from each other on account of limited space. The case is described in which width Wp and Wn of the p-type polysilicon 10 and the n-type polysilicon 11 of the thermocouple 13 are made different from each other in the above-mentioned embodiment, however it is also allowed to make thickness tp and tn of the p-type polysilicon 10A and the n-type polysilicon 11A of the thermocouple 13 different from each other as shown in FIG. 3. Also in this case, it is possible to obtain large SN ratio by setting the thickness ratio tp/tn in the range of $\sqrt{(m)}$ and $\sqrt{(m)}/n$.

Figure 4A:
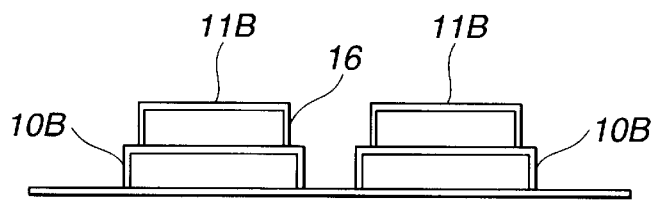
FIG. 4A is a partially sectional view of an infrared detecting device according to the other embodiment of the present invention illustrating a case of laminating n-type polysilicon on p-type polysilicon different in their width from each other.
Figure 4B:
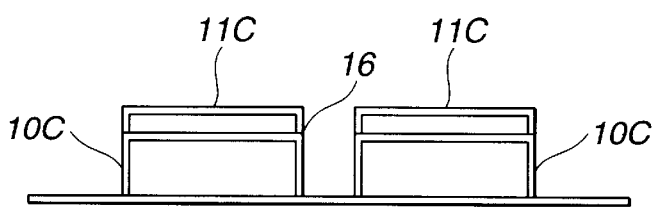
FIG. 4B is a partially sectional view illustrating a case of laminating n-type polysilicon on p-type polysilicon different in their thickness from each other.
Figure 5A:
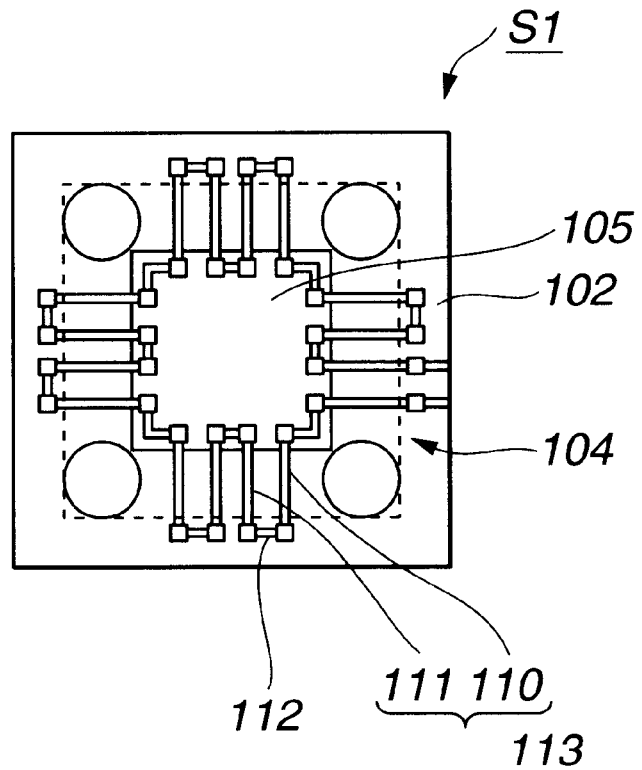
FIG. 5A is a top view showing a conventional infrared detecting device formed by etching the semiconductor substrate from surface side thereof.
Figure 5B:
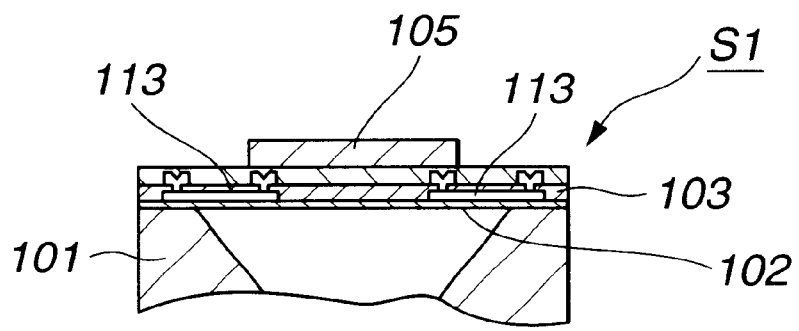
FIG. 5B is a partially sectional view of the infrared detecting device shown in FIG. 5A.
Figure 6A:
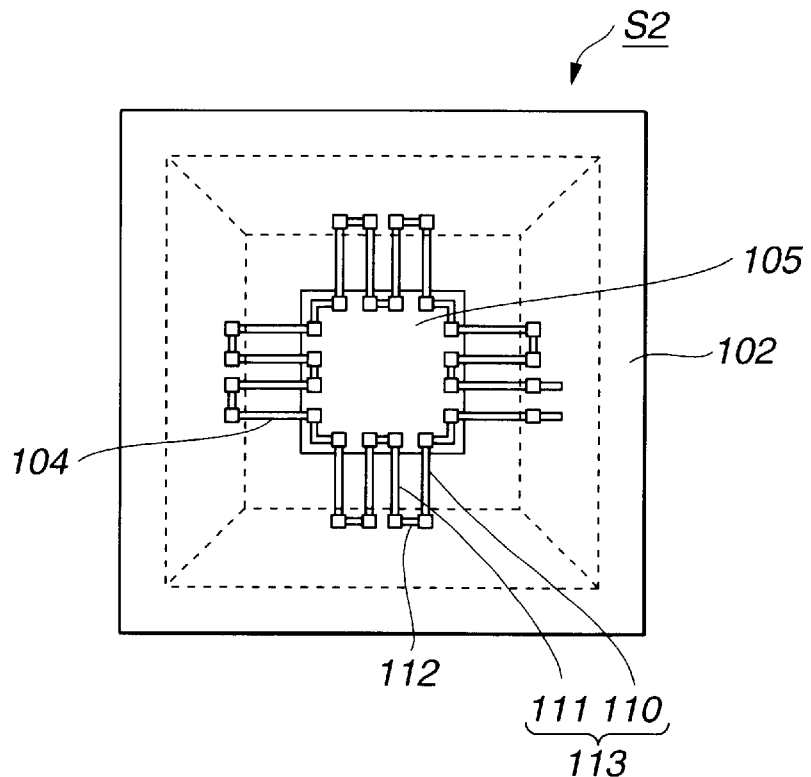
FIG. 6A is a top view showing a conventional infrared detecting device formed by etching the semiconductor substrate from back side thereof.
Figure 6B:
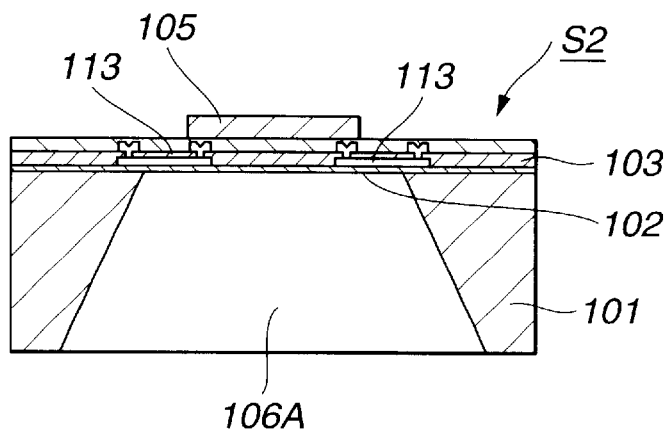
FIG. 6B is a partially sectional view of the infrared detecting device shown in FIG. 6A.

Moreover, although the case is described in which the p-type polysilicon 10 and the n-type polysilicon 11 of the thermocouple 13 are horizontally arranged in the above-mentioned embodiment, the present invention is not limited to such the case, it is also allowed to use the configuration obtained by vertically stacking up the n-type polysilicon 11B and the p-type polysilicon 10B having width Wp and Wn different from each other through an insulation layer 16 as shown in FIG. 4A. Besides, as shown in FIG. 4B, it is allowed to use the configuration obtained by vertically stacking up the n-type polysilicon 11C and the p-type polysilicon 10C having thickness tp and tn different from each other through the insulation layer 16 as shown in FIG. 4B.

Furthermore, in a case where the p-type polysilicon and the n-type polysilicon are equivalent in their thickness and partially different in their width from each other, it is possible to obtain the thermopile-type infrared detecting device having high SN ratio by setting the average width of the respective polysilicons in the above-mentioned range.

The detailed configuration of the infrared detecting device according to the present invention is not restricted only to the aforementioned embodiment. In a case of taking a serious view of the response speed in the device, it is possible to use, for example, the configuration of the device in that the gap between the p-type polysilicon and the n-type polysilicon adjacent to each other, which are equivalent in their thickness, is constant and the width of the n-type polysilicon having the heat conductivity higher than that of the p-type polysilicon is maximized when the polysilicons have the same concentration of impurities.

As mentioned above, according to the infrared detecting device of this invention, it is possible to individually decide sectional areas of the p-type polysilicon and the n-type polysilicon of the thermocouple in accordance with the electric resistivity and the heat conductivity of the both polysilicons. Therefore, an excellent effect can be obtained in that it is possible to realize the improvement of SN ratio by deriving ability of the both polysilicons sufficiently.

In the infrared detecting device according to the preferable embodiment of this invention, a very excellent effect can be obtained in that it is possible to set sectional areas of the p-type polysilicon and the n-type polysilicon of the thermocouple into the optimum value and possible to substantially increase the SN ratio up to the maximum value.

In the infrared detecting device according to the fifth or sixth preferable embodiment of this invention, a very excellent effect can be obtained in that it is possible to set width of the p-type polysilicon and the n-type polysilicon of the thermocouple (thicknesses of the both polysilicons in the case of the infrared detecting device of the sixth preferable embodiment) into the optimum value and possible to improve the SN ratio in the maximum or nearly maximum value.

According to the infrared detecting of the other preferable embodiment of this invention, a very excellent effect can be obtained in that it is possible to greatly improve the response speed.

What is claimed is:

1. An infrared detecting device comprising:
a semiconductor substrate;
a diaphragm set on said semiconductor substrate and having low thermal conductivity;
a thermopile formed on said diaphragm by arranging a plurality of thermocouples composed of p-type polysilicon and n-type polysilicon in a row and electrically connecting said thermocouples with each other in series; and
a heat absorption film formed on a detecting section of said thermopile through an insulation layer, wherein said p-type and n-type polysilicons are different in their predetermined sectional areas from each other at a position between a hot junction and a cold junction of each of said thermocouples forming the thermopile.

2. An infrared detecting device according to claim 1, wherein said p-type and n-type polysilicons are different in their average sectional areas from each other at the position between said hot and cold junctions of each of said thermocouples.

3. An infrared detecting device according to claim 1, wherein Ap/An ratio of the sectional area of said p-type polysilicon to that of said n-type polysilicon is in a range of $\sqrt{(m)}$ to $\sqrt{(m)}/n$ when a gap between said p-type and n-type polysilicons is constant and $\rho p/\rho n$ ratio of electric resistivity of said polysilicons is defined as "m" and kp/kn ratio of thermal conductivity of said polysilicons is defined as "n".

4. An infrared detecting device according to claim 1, wherein said p-type and n-type polysilicons are equivalent in their thickness, and different in their width from each other at the position between said hot and cold junctions of each of said thermocouples.

5. An infrared detecting device according to claim 4, wherein Wp/Wn ratio of the width of said p-type polysilicon to that of said n-type polysilicon is in a range of $\sqrt{(m)}$ to $\sqrt{(m)}/n$ when a gap between said p-type and n-type polysilicons is constant, said p-type and n-type polysilicons are equivalent in their thickness, $\rho p/\rho n$ ratio of electric resistivity of said polysilicons is defined as "m" and kp/kn ratio of thermal conductivity of said polysilicons is defined as "n".

6. An infrared detecting device according to claim 4, wherein ratio of width of polysilicon with high thermal conductivity to that of polysilicon with low thermal conductivity is maximized when the number of said thermocouples and a gap between said p-type and n-type polysilicons are constant, and said polysilicons are equivalent in their thickness.

7. An infrared detecting device according to claim 1, wherein said p-type and n-type polysilicons are equivalent in their width, and different in their thickness from each other at the position between said hot and cold junctions of each of said thermocouples.

8. An infrared detecting device according to claim 5, wherein tp/tn ratio of the thickness of said p-type polysilicon to that of said n-type polysilicon is in a range of $\sqrt{(m)}$ to $\sqrt{(m)}/n$ when a gap between said p-type and n-type polysilicons is constant, said p-type and n-type polysilicons are equivalent in their width, $\rho p/\rho n$ ratio of electric resistivity of said polysilicons is defined as "m" and kp/kn ratio of thermal resistivity of said polysilicons is defined as "n".

9. An infrared detecting device according to claim 1, wherein respective ones of said p-type and n-type polysilicons are vertically stacked, are equivalent in their width, and different in their thickness from each other at the position between said hot and cold junctions of each of said thermocouples.

10. An infrared detecting device according to claim 1, wherein respective ones of said p-type and n-type polysilicons are vertically stacked, are equivalent in their thickness, and different in their width from each other at the position between said hot and cold junctions of each of said thermocouples.

11. An infrared detecting device comprising:
a semiconductor substrate;
a diaphragm set on said semiconductor substrate and having low thermal conductivity;
a thermopile formed on said diaphragm by arranging a plurality of thermocouples composed of p-type polysilicon and n-type polysilicon in a row and electrically connecting said thermocouples with each other in series; and
a heat absorption film formed on a detecting section of said thermopile through an insulation layer, wherein said p-type and n-type polysilicons are different in their sectional areas from each other at a position between a hot junction and a cold junction of each of said thermocouples forming the thermopile,
wherein Ap/An ratio of the sectional area of said p-type polysilicon to that of said n-type polysilicon is in a range of $\sqrt{(m)}$ to $\sqrt{(m)}/n$ when a gap between said p-type and n-type polysilicons is constant and $\rho p/\rho n$ ratio of electric resistivity of said polysilicons is defined as "m" and kp/kn ratio of thermal conductivity of said polysilicons is defined as "n".

12. An infrared detecting device comprising:
a semiconductor substrate;
a diaphragm set on said semiconductor substrate and having low thermal conductivity;
a thermopile formed on said diaphragm by arranging a plurality of thermocouples composed of p-type polysilicon and n-type polysilicon in a row and electrically connecting said thermocouples with each other in series; and
a heat absorption film formed on a detecting section of said thermopile through an insulation layer, wherein said p-type and n-type polysilicons are different in their sectional areas from each other at a position between a hot junction and a cold junction of each of said thermocouples forming the thermopile
wherein said p-type and n-type polysilicons are equivalent in their thickness, and different in their width from each other at the position between said hot and cold junctions of each of said thermocouples.

13. An infrared detecting device according to claim 12, wherein Wp/Wn ratio of the width of said p-type polysilicon to that of said n-type polysilicon is in a range of $\sqrt{(m)}$ to $\sqrt{(m)}/n$ when a gap between said p-type and n-type polysilicons is constant, said p-type and n-type polysilicons are equivalent in their thickness, $\rho p/\rho n$ ratio of electric resistivity of said polysilicons is defined as "m" and kp/kn ratio of thermal conductivity of said polysilicons is defined as "n".

14. An infrared detecting device according to claim 12, wherein tp/tn ratio of the thickness of said p-type polysilicon to that of said n-type polysilicon is in a range of $\sqrt{(m)}$ to $\sqrt{(m)}/n$ when a gap between said p-type and n-type polysilicons is constant, said p-type and n-type polysilicons are equivalent in their width, $\rho p/\rho n$ ratio of electric resistivity of said polysilicons is defined as "m" and kp/kn ratio of thermal resistivity of said polysilicons is defined as "n".

15. An infrared detecting device according to claim 12, wherein ratio of width of polysilicon with high thermal conductivity to that of polysilicon with low thermal conductivity is maximized when the number of said thermocouples and a gap between said p-type and n-type polysilicons are constant, and said polysilicons are equivalent in their thickness.

16. An infrared detecting device comprising:

a semiconductor substrate;

a diaphragm set on said semiconductor substrate and having low thermal conductivity;

a thermopile formed on said diaphragm by arranging a plurality of thermocouples composed of p-type polysilicon and n-type polysilicon in a row and electrically connecting said thermocouples with each other in series; and a heat absorption film formed on a detecting section of said thermopile through an insulation layer, wherein said p-type and n-type polysilicons are different in their sectional areas from each other at a position between a hot junction and a cold junction of each of said thermocouples forming the thermopile wherein said p-type and n-type polysilicons are equivalent in their width, and different in their thickness from each other at the position between said hot and cold junctions of each of said thermocouples.

* * * * *